US012518821B2

(12) United States Patent
Liao et al.

(10) Patent No.: US 12,518,821 B2
(45) Date of Patent: Jan. 6, 2026

(54) PSEUDO MULTI-PORT MEMORY WITH MEMORY CELLS EACH HAVING TWO-PORT MEMORY CELL ARCHITECTURE AND MULTIPLE ENABLE PULSES ON SAME WORDLINE AND ASSOCIATED MEMORY ACCESS METHOD

(71) Applicant: MEDIATEK INC., Hsin-Chu (TW)

(72) Inventors: Weinan Liao, Hsinchu (TW); Chi-Hao Hong, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 270 days.

(21) Appl. No.: 18/228,621

(22) Filed: Jul. 31, 2023

(65) Prior Publication Data
US 2024/0105259 A1    Mar. 28, 2024

Related U.S. Application Data

(60) Provisional application No. 63/376,787, filed on Sep. 23, 2022.

(51) Int. Cl.
*G11C 11/418* (2006.01)
*G11C 11/419* (2006.01)
(52) U.S. Cl.
CPC .......... *G11C 11/418* (2013.01); *G11C 11/419* (2013.01)
(58) Field of Classification Search
CPC ................................................. G11C 11/418
See application file for complete search history.

(56) References Cited

U.S. PATENT DOCUMENTS

| 11,676,657 B2* | 6/2023 | Kuo | G11C 7/065 365/154 |
| 2014/0136778 A1 | 5/2014 | Khailany | |
| 2019/0108875 A1 | 4/2019 | Singh | |
| 2021/0065784 A1 | 3/2021 | Braceras | |
| 2022/0310156 A1* | 9/2022 | Raj | G11C 11/412 |
| 2023/0047801 A1* | 2/2023 | Noel | G06F 3/0673 |

OTHER PUBLICATIONS

Yabuuchi, "A 6.05-Mb/mm2 16-nm FinFET Double Pumping 1W1R 2-port SRAM with 313 ps Read Access Time", 2016 IEEE Symposium on VLSI Circuits, Jun. 15, 2016.

* cited by examiner

*Primary Examiner* — Douglas King
(74) *Attorney, Agent, or Firm* — Winston Hsu

(57) ABSTRACT

A pseudo multi-port memory includes a memory array, a row decoder circuit, a timing controller circuit, a sense amplifier circuit, and a write driver circuit. The timing controller circuit outputs a timing control signal to the row decoder circuit, wherein during one memory clock cycle, the row decoder circuit is controlled by the timing control signal to make a read wordline (RWL) signal have an enable pulse and a write wordline (WWL) signal have multiple enable pulses. During one memory clock cycle, the sense amplifier circuit performs read operations upon a selected memory cell when the selected RWL is enabled by the enable pulse and the selected WWL is enabled by at least one first enable pulse, and the write driver circuit performs a write operation upon the selected memory cell when the selected WWL is enabled by one second enable pulse.

12 Claims, 3 Drawing Sheets

PSEUDO MULTI-PORT MEMORY WITH MEMORY CELLS EACH HAVING TWO-PORT MEMORY CELL ARCHITECTURE AND MULTIPLE ENABLE PULSES ON SAME WORDLINE AND ASSOCIATED MEMORY ACCESS METHOD

CROSS REFERENCE TO RELATED APPLICATIONS

This application claims the benefit of U.S. Provisional Application No. 63/376,787, filed on Sep. 23, 2022. The content of the application is incorporated herein by reference.

BACKGROUND

The present invention relates to a memory design, and more particularly, to a pseudo multi-port memory with memory cells each having a two-port memory cell architecture and multiple enable pulses on a same wordline and an associated memory access method.

Filter operations are frequently used in various image processing blocks. Regarding a filter in an image processing block, a cache storage element can be used to temporarily retain pixel data of a source image. The traditional approach for this cache storage element is by using single-port static random access memory (SRAM) bit-cells (e.g., six-transistor (6T) single-port SRAM: bit-cells) or two-port SRAM bit-cells (e.g., 8T two-port SRAM bit-cells). In some applications, an image processing block is required to have a larger pixel output bandwidth. One traditional approach increases the pixel output bandwidth (i.e., read throughput) of the image processing block at the expense of hardware cost and chip area. Thus, there is a need for an innovative memory design which can have an increased read throughput under a moderate cost burden.

SUMMARY

One of the objectives of the claimed invention is to provide a pseudo multi-port memory with memory cells each having a two-port memory cell architecture and multiple enable pulses on a same wordline and an associated memory access method.

According to a first aspect of the present invention, an exemplary pseudo multi-port memory is disclosed. The exemplary pseudo multi-port memory includes a memory array, a row decoder circuit, and a timing controller circuit. The memory array includes a plurality of read wordlines (RWLs), a plurality of write wordlines (WWLs), and a plurality of memory cells, wherein each of the plurality of memory cells is coupled to one of the plurality of RWLs and one of the plurality of WWLs, and has a two-port memory cell architecture. The row decoder circuit is arranged to generate and output an RWL signal to a selected RWL, and generate and output a WWL signal to a selected WWL, wherein a selected memory cell of the plurality of memory cells is coupled to the selected RWL and the selected WWL. The timing controller circuit is arranged to generate and output a timing control signal to the row decoder circuit, wherein during one memory clock cycle of the pseudo multi-port memory, the row decoder circuit is controlled by the timing control signal to make the RWL signal have an enable pulse and the WWL signal have a plurality of enable pulses. The sense amplifier circuit is arranged to perform a read operation upon the selected memory cell when the selected RWL is enabled by the enable pulse, and is further arranged to perform at least one read operation upon the selected memory cell when the selected WWL is enabled by at least one first enable pulse included in the plurality of enable pulses. The write driver circuit is arranged to perform a write operation upon the selected memory cell when the selected WWL is enabled by one second enable pulse included in the plurality of enable pulses.

According to a second aspect of the present invention, an exemplary method for accessing a memory array is disclosed. The memory array includes a plurality of read wordlines (RWLs), a plurality of write wordlines (WWLs), and a plurality of memory cells, wherein each of the plurality of memory cells is coupled to one of the plurality of RWLs and one of the plurality of WWLs, and has a two-port memory cell architecture. The exemplary method includes: performing a timing control operation to generate and output a timing control signal; performing a row decoding operation according to the timing control signal, for generating and outputting an RWL signal to a selected RWL and generating and outputting a WWL signal to a selected WWL, wherein a selected memory cell of the plurality of memory cells is coupled to the selected RWL and the selected WWL; and during one memory clock cycle, the RWL signal has an enable pulse, and the WWL signal has a plurality of enable pulses; performing a read operation upon the selected memory cell when the selected RWL is enabled by the enable pulse; performing at least one read operation upon the selected memory cell when the selected WWL is enabled by at least one first enable pulse included in the plurality of enable pulses; and performing a write operation upon the selected memory cell when the selected WWL is enabled by one second enable pulse included in the plurality of enable pulses.

According to a third aspect of the present invention, an exemplary memory array is disclosed. The exemplary memory array includes a plurality of hierarchical bitlines, each having a first bitline routed on a first metal layer, and a second bitlines routed on a second metal layer that is different from the first metal layer; and further includes a plurality of memory cells, having a first group of memory cells coupled to the first bitline of a hierarchical bitline, and a second group of memory cells coupled to the second bitline of the hierarchical bitline, wherein the first group of memory cells and the second group of memory cells are located at a same column.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
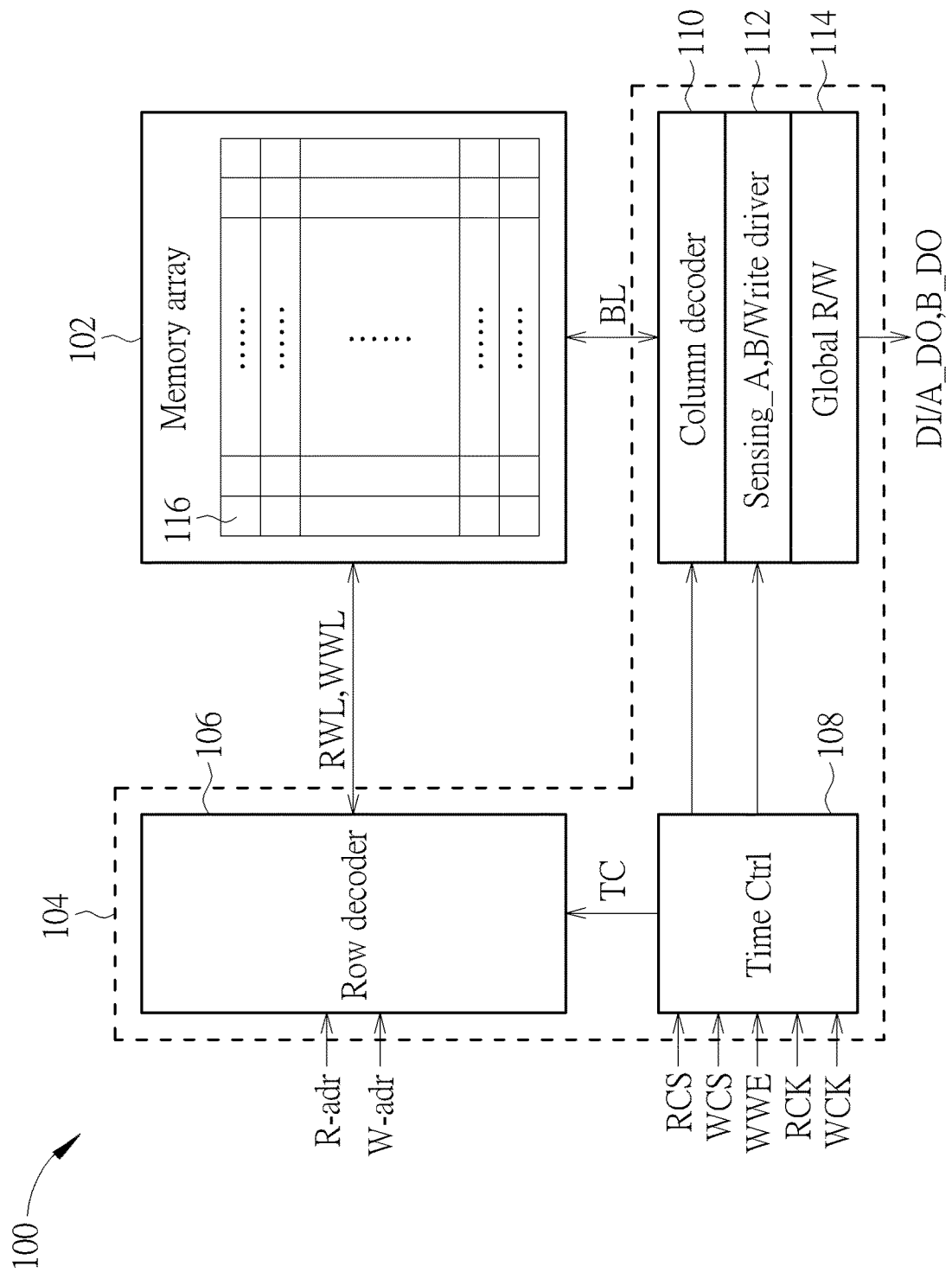
FIG. 1 is a diagram illustrating a pseudo multi-port memory according to an embodiment of the present invention.

FIG. 1 is a diagram illustrating a pseudo multi-port memory according to an embodiment of the present invention. The pseudo multi-port memory 100 includes a memory array 102 and a peripheral circuit 104. The peripheral circuit 104 is arranged to control access (read (R)/write (W)) of the memory array 102, and may include a row decoder circuit (labeled by "Row decoder") 106, a timing controller circuit (labeled by "Time Ctrl") 108, a column decoder circuit (labeled by "Column decoder") 110, a sense amplifier circuit & write driver circuit (labeled by "Sensing_A,B/Write driver") 112, and a global R/W circuit (labeled by "Global R/W") 114.

Figure 2:
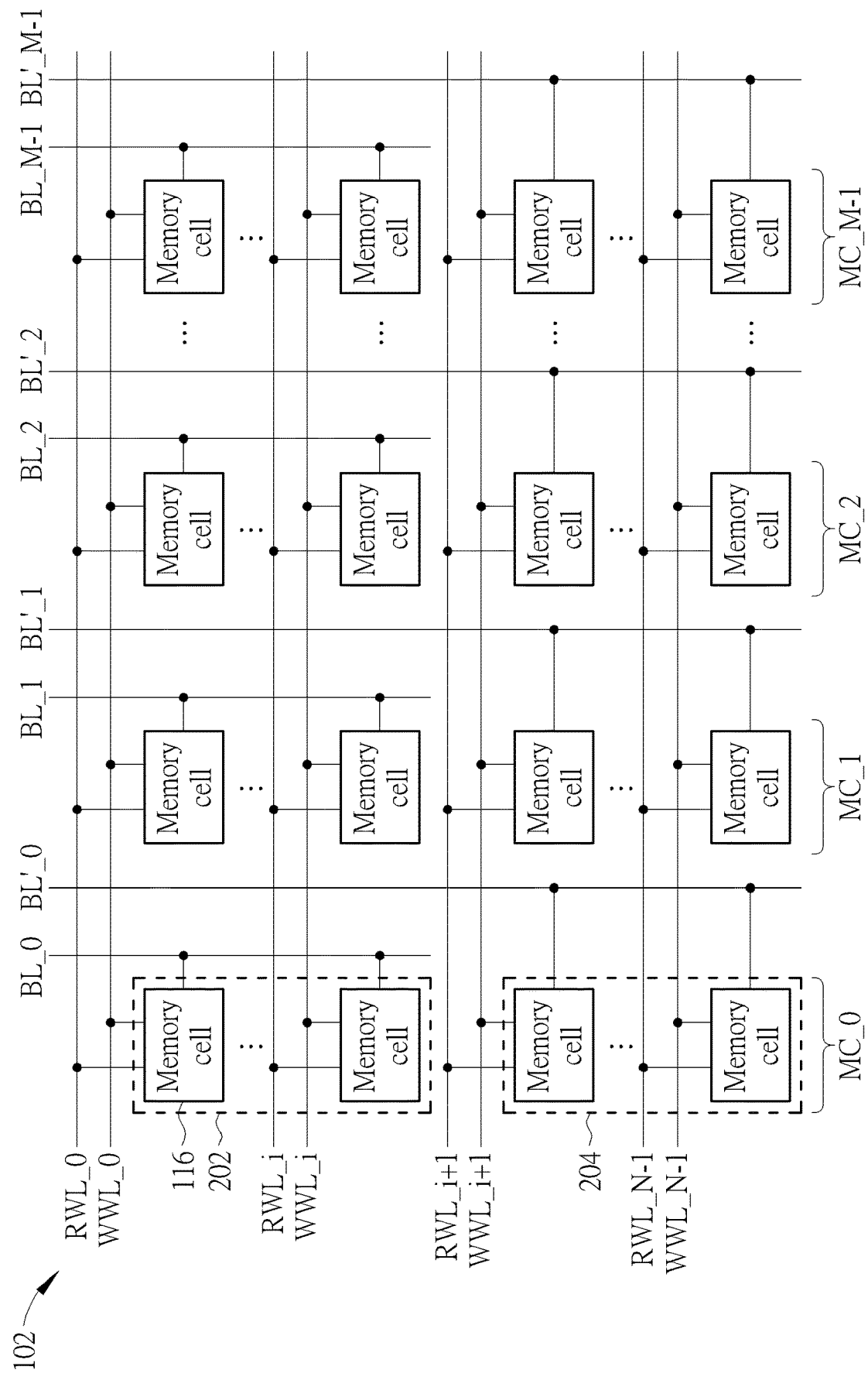
FIG. 2 is a diagram illustrating an example of the memory array shown in FIG. 1.

The memory array 102 includes a plurality of memory cells 116 arranged in a two-dimensional (2D) array with a plurality of rows and a plurality of columns. FIG. 2 is a diagram illustrating an example of the memory array 102 shown in FIG. 1. In this embodiment, each of the memory cells 116 may have a two-port SRAM cell architecture for storing one bit, such as an 8T bit-cell architecture. Hence, the memory array 102 includes a plurality of read wordlines RWL_0-RWL_N−1, a plurality of write wordlines WWL_0-WWL_N−1, and a plurality of bitlines BL_0-BL_M−1, BL'_0-BL'_M−1, where a read wordline RWL_j and a write wordline WWL_j (j={0, 1, . . . , N−1}) correspond to a same memory cell row, and two bitlines BL_k and BL'_k (k={0, 1, . . . , M−1}) correspond to a same memory cell column. The 8T two-port SRAM bit-cell architecture may include a read bitline RBL and a pair of write bitlines WBL and WBLB ($\overline{WBL}$). In this embodiment, the read bitline RBL and the write bitlines WBL, WBLB ($\overline{WBL}$) may be collectively regarded as a bitline of a memory cell for brevity and simplicity.

In this embodiment, a hierarchical bitline structure can be adopted to improve the memory cell density and the memory access speed. For example, the bitlines BL_0-BL_M−1 are routed on a first metal layer (e.g., M0), and the bitlines BL'_0-BL'_M−1 are fly-bitlines (FBLs) that are routed on a second metal layer (e.g., M2) different from the first metal layer (e.g., M0). Regarding each of the memory cell columns MC_0-MC_M−1, the memory cells 116 located at the same memory cell column MC_k (k={0, 1, . . . , M−1}) are categorized into a first group of memory cells 202 and a second group of memory cells 204, where the first group of memory cells 202 is coupled to the bitline BL_k (k={0, 1, . . . , M−1}), and the second group of memory cells 204 is coupled to the bitline BL'_k (k={0, 1, . . . , M−1}). Since all memory cells belonging to the same memory cell column are not needed to be coupled to the same single bitline with a long length, each of the bitlines BL_k and BL'_k (k={0, 1, . . . , M−1}) can have a shorter length, thereby improving the memory access speed. Furthermore, since all memory cells belonging to the same memory cell column are not needed to be coupled to the same single bitline routed on one metal layer, using the bitlines BL_k and BL'_k (k={0, 1, . . . , M−1}) routed on different metal layers allows higher density of memory cells. Since impedance of the bitline BL_k (k={0, 1, . . . , M−1}) may not be the same as that of the bitline BL'_k (k={0, 1, . . . , M−1}), an imbalanced FBL/non-FBL load can be employed to compensate speed and power. For example, a cell number of the first group of memory cells 202 may be different from a cell number of the second group of memory cells 204. However, this is for illustrative purposes only, and is not meant to be a limitation of the present invention.

The present invention is focused on a pseudo multi-port memory with the use of memory cells each having a two-port memory cell architecture (e.g., 8T two-port SRAM bit-cell architecture). For example, the present invention proposes using a double pump scheme to achieve a pseudo three-port memory with the use of memory cells each having the two-port memory cell architecture (e.g., 8T two-port SRAM bit-cell architecture). The row decoder circuit 106 shown in FIG. 1 is arranged to decode a read address R-adr (particularly, a first part of address bits included in read address R-adr) and a write address W-adr (particularly, a first part of address bits included in write address W-adr), for generating and outputting a read wordline signal to a selected read wordline RWL, and generating and outputting a write wordline signal to a selected write wordline WWL, wherein a selected memory cell of the memory cells 116 included in the memory array 102 is coupled to the selected read wordline RWL and the selected write wordline WWL. The column decoder circuit 110 is arranged to decode the read address R-adr (particularly, a second part of address bits included in read address R-adr) and the write address W-adr (particularly, a second part of address bits included in write address W-adr) for generating and outputting a bitline signal to a selected bitline BL, wherein the selected memory cell of the memory cells 116 included in the memory array 102 is coupled to the selected bitline BL. For example, assuming that the read address R-adr and the write address W-adr are both directed to the same memory cell located at an intersection of the $1^{st}$ memory cell row and the $1^{st}$ memory column, the read wordline signal generated from the row decoder circuit 106 is supplied to the read wordline RWL 0 (i.e., RWL=RWL_0) shown in FIG. 2, the write wordline signal generated from the row decoder circuit 106 is supplied to the write wordline WWL_0 (i.e., WWL=WWL_0) shown in FIG. 2, and the bitline signal generated from the column decoder circuit 110 is supplied to the bitline BL_0 (i.e., BL=BL_0) shown in FIG. 2.

The timing controller circuit 108 is arranged to generate and output a timing control signal (which may include one or more clock signals) TC to the row decoder circuit 106. The row decoder circuit 106 is controlled by the timing control signal TC to make the read wordline signal have an enable pulse and the write wordline signal have a plurality of enable pulses during one memory clock cycle of the pseudo multi-port memory 100. Hence, during one memory clock cycle of the pseudo multi-port memory 100, the sense amplifier circuit (which is a part of the circuit block 112 shown in FIG. 1) is arranged to perform a read operation upon the selected memory cell when the selected read wordline RWL is enabled by the enable pulse included in the read wordline signal, and is further arranged to perform at least one read operation upon the selected memory cell when the selected write wordline WWL is enabled by at least one first enable pulse included in the enable pulses of the write wordline signal. In addition, during the same memory clock cycle of the pseudo multi-port memory 100, a write driver circuit (which is a part of the circuit block 112 shown in FIG. 1) is arranged to perform a write operation upon the selected memory cell when the selected write wordline WWL is enabled by one second enable pulse included in the enable pulses of the write wordline signal. For example, regarding the write wordline signal provided to the selected write wordline WWL, the first enable pulse(s) for read operation(s) may be immediately followed by the second enable pulse for write operation.

Figure 3:
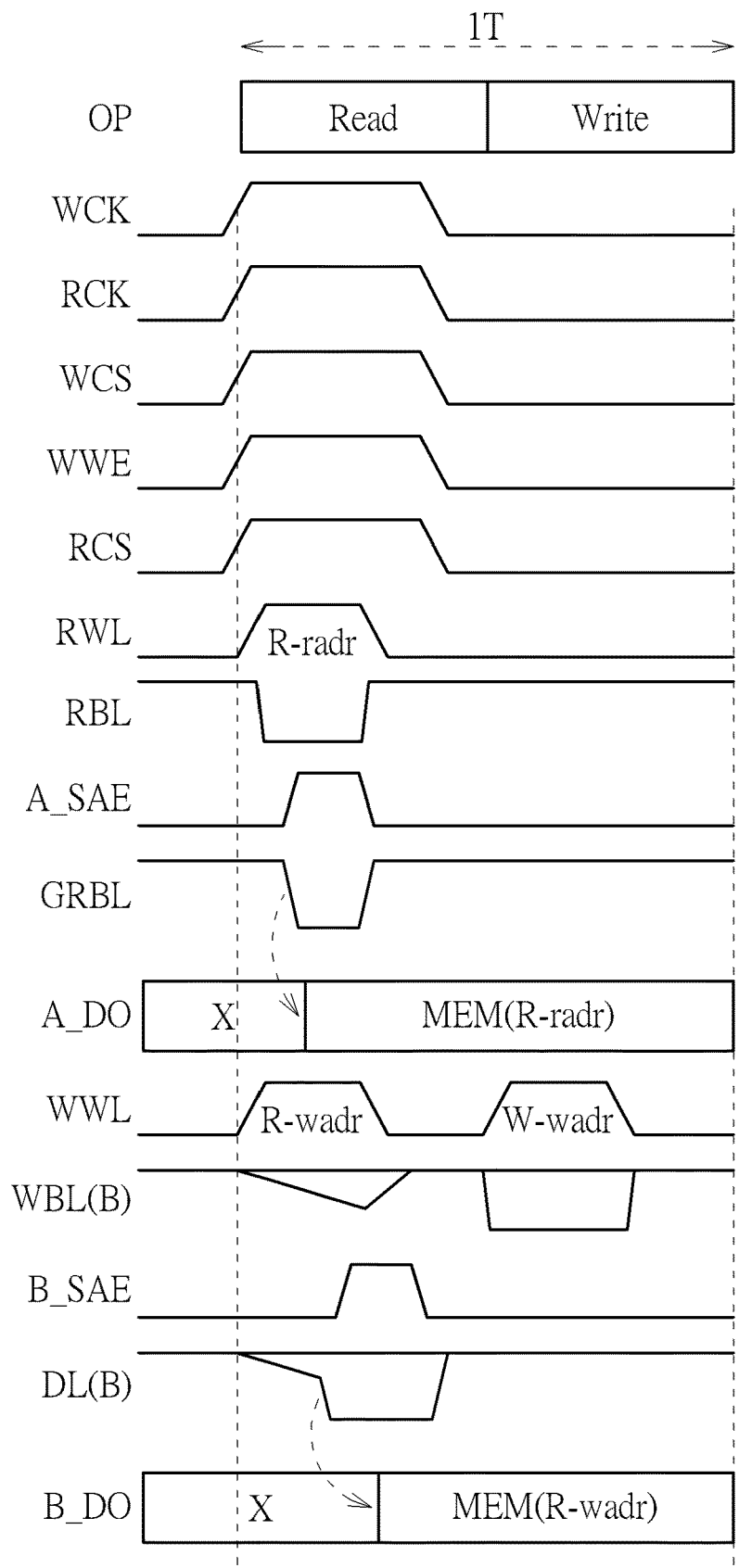
FIG. 3 is a diagram illustrating waveforms of a plurality of signals used by the pseudo multi-port memory shown in FIG. 1 according to an embodiment of the present invention.

Please refer to FIG. 2 in conjunction with FIG. 3. FIG. 3 is a diagram illustrating waveforms of a plurality of signals used by the pseudo multi-port memory 100 shown in FIG. 1 according to an embodiment of the present invention. The timing controller circuit 108 generates the timing control signal TC according to chip select signals (e.g., RCS and WCS), write enable signal (e.g., WWE), and clock signals (e.g., RCK and WCK). During a read period (i.e., OP=read) of one memory clock cycle 1T, pre-charging is applied to a read bitline RBL_of the selected memory cell (which may have the 8T two-port SRAM bit-cell architecture) and then turned off, a read wordline RWL of the selected memory cell is driven high by the enable pulse R-radr of the read wordline signal generated from the timing controller circuit 108, and a sense amplifier of the sense amplifier circuit is activated (A_SAE=1) to capture the value A_D0 (A_D0=MEM(R-radr)) on the read bitline RBL and output the captured value via a global read bitline GRBL; and pre-charging is applied to write bitlines WBL, WBLB ($\overline{WBL}$) of the selected memory cell and then turned off, a write wordline signal of the selected memory cell is driven high by the enable pulse R-wadr of the write wordline signal generated from the timing controller circuit 108, and a sense amplifier of the sense amplifier circuit is activated (B SAE=1) to capture the value B_D0 (B_D0=MEM(R-wadr)) on the write bitlines WBL, WBLB ($\overline{WBL}$) and output the captured value via data lines DL and DLB ($\overline{DL}$), where the write bitlines WBL, WBLB ($\overline{WBL}$) can be re-used as read bitlines.

During a write period (i.e., OP=write) of the same memory clock cycle 1T, the write driver circuit drives the write bitlines WBL, WBLB ($\overline{WBL}$) of the selected memory cell, and a write wordline WWL of the selected memory cell is driven high by the enable pulse W-wadr of the write wordline signal generated from the timing controller circuit 108. As can be seen from FIG. 3, the selected memory cell performs two read operations and one write operation (i.e., 1W2R) during one memory clock cycle 1T, which results in a pseudo three-port memory cell (which is based on a two-port memory cell architecture) due to the use of the double pump scheme. It should be noted that the write wordline signal generated from the timing controller circuit 108 is not limited to only two enable pulses, including one enable pulse for a read operation and another enable pulse for a write operation. In practice, the write wordline signal generated from the timing controller circuit 108 may be configured to have N (N>2) enable pulses, including (N−1) enable pulses for (N−1) read operations and an enable pulse for a write operation.

Compared to a typical memory design which uses four 1W1R two-port memories arranged in a parallel fashion to achieve 4× read throughput, the proposed memory design can achieve the same 4× read throughput by using only two pseudo three-port memories (i.e., two 1W2R memories). Hence, the use of the proposed pseudo three-port memories enables a new memory design which can achieve the read throughput enhancement without suffering the cost burden issue of the typical memory design.

The pseudo multi-port memory 100 may employ a hierarchical bitline structure (which uses an FBL and a non-FBL for pseudo multi-port memory cells located at the same column) to improve the memory cell density and the memory access speed. However, this is for illustrative purposes only, and is not meant to be a limitation of the present invention. As mentioned above, the present invention is focused on a pseudo multi-port memory with the use of memory cell each having a two-port memory cell architecture. It should be noted that any pseudo multi-port memory design using the proposed pump scheme (e.g., double pump scheme) to enable each memory cell to act as a pseudo multi-port memory cell (e.g., a pseudo three-port memory cell) falls within the scope of the present invention.

Furthermore, any memory design using the proposed hierarchical bitline structure (which uses an FBL and a non-FBL for memory cells located at the same column) to improve the memory cell density and the memory access speed also falls within the scope of the present invention. In the above embodiment, the proposed hierarchical bitline structure is applied to the memory cells 116 each being a pseudo three-port memory cell implemented based on a two-port memory cell architecture, where during one memory clock cycle, a write wordline signal received by the memory cell has multiple enable pulses. In a first alternative design, the proposed hierarchical bitline structure may be applied to the memory cells 116 each being a typical two-port memory. In a second alternative, the proposed hierarchical bitline structure may be applied to the memory cells 116 each being a typical single-port memory. In a third alternative design, the proposed hierarchical bitline structure may applied to the memory cells 116 each being a pseudo two-port memory cell implemented based on a single-port memory cell architecture, where during one memory clock cycle, a wordline signal received by the memory cell has multiple enable pulses (e.g., one enable pulse for a read operation and another enable pulse for a write operation). In a fourth alternative design, the proposed hierarchical bitline structure may be applied to the memory cells 116 that are used by a register file.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pseudo multi-port memory comprising:
   a memory array, comprising:
      a plurality of read wordlines (RWLs);
      a plurality of write wordlines (WWLs); and
      a plurality of memory cells, wherein each of the plurality of memory cells is coupled to one of the plurality of RWLs and one of the plurality of WWLs, and has a two-port memory cell architecture;
   a row decoder circuit, arranged to generate and output an RWL signal to a selected RWL, and generate and output a WWL signal to a selected WWL, wherein a selected memory cell of the plurality of memory cells is coupled to the selected RWL and the selected WWL;
   a timing controller circuit, arranged to generate and output a timing control signal to the row decoder circuit, wherein during one memory clock cycle of the pseudo multi-port memory, the row decoder circuit is controlled by the timing control signal to make the RWL signal have an enable pulse and the WWL signal have a plurality of enable pulses;
   a sense amplifier circuit, arranged to perform a read operation upon the selected memory cell when the selected RWL is enabled by the enable pulse, and is further arranged to perform at least one read operation upon the selected memory cell when the selected WWL is enabled by at least one first enable pulse included in the plurality of enable pulses; and a write driver circuit, arranged to perform a write operation upon the selected memory cell when the selected WWL is enabled by one second enable pulse included in the plurality of enable pulses.

2. The pseudo multi-port memory of claim 1, wherein the two-port memory cell architecture is a two-port static random access memory (SRAM) cell architecture.

3. The pseudo multi-port memory of claim 2, wherein the two-port SRAM cell architecture is an 8T bit-cell architecture.

4. The pseudo multi-port memory of claim 1, wherein the pseudo multi-port memory is a pseudo three-port memory, and the plurality of enable pulses of the WWL signal comprise only a single first enable pulse for one read operation.

5. The pseudo multi-port memory of claim 1, wherein the plurality of memory cells comprises a first group of memory cells and a second groups of memory cells, where the first group of memory cells and the second groups of memory cells are located at a same column; and the memory array further comprises:
  a hierarchical bitline, comprising:
    a first bitline, routed on a first metal layer and coupled to the first group of memory cells; and
    a second bitlines, routed on a second metal layer different from the first metal layer, and coupled to the second group of memory cells.

6. The pseudo multi-port memory of claim 5, wherein a cell number of the first group of memory cells is different from a cell number of the second group of memory cells.

7. A method for accessing a memory array that comprises a plurality of read wordlines (RWLs), a plurality of write wordlines (WWLs), and a plurality of memory cells, wherein each of the plurality of memory cells is coupled to one of the plurality of RWLs and one of the plurality of WWLs, and has a two-port memory cell architecture; the method comprising:
  performing a timing control operation to generate and output a timing control signal;
  performing a row decoding operation according to the timing control signal, for generating and outputting an RWL signal to a selected RWL and generating and outputting a WWL signal to a selected WWL, wherein a selected memory cell of the plurality of memory cells is coupled to the selected RWL and the selected WWL; and during one memory clock cycle, the RWL signal has an enable pulse, and the WWL signal has a plurality of enable pulses;
  performing a read operation upon the selected memory cell when the selected RWL is enabled by the enable pulse;
  performing at least one read operation upon the selected memory cell when the selected WWL is enabled by at least one first enable pulse included in the plurality of enable pulses; and
  performing a write operation upon the selected memory cell when the selected WWL is enabled by one second enable pulse included in the plurality of enable pulses.

8. The method of claim 7, wherein the two-port memory cell architecture is a two-port static random access memory (SRAM) cell architecture.

9. The method of claim 8, wherein the two-port SRAM cell architecture is an 8T bit-cell architecture.

10. The method of claim 7, wherein the plurality of enable pulses of the WWL signal comprise only a single first enable pulse for one read operation.

11. The method of claim 7, wherein the plurality of memory cells comprises a first group of memory cells and a second groups of memory cells, where the first group of memory cells and the second groups of memory cells are located at a same column; and the method further comprises:
  accessing the first group of memory cells and the second groups of memory cells through a hierarchical bitline, wherein the hierarchical bitline comprises:
    a first bitline, routed on a first metal layer and coupled to the first group of memory cells; and
    a second bitlines, routed on a second metal layer different from the first metal layer, and coupled to the second group of memory cells.

12. The method of claim 11, wherein a cell number of the first group of memory cells is different from a cell number of the second group of memory cells.

* * * * *